Figure 1:
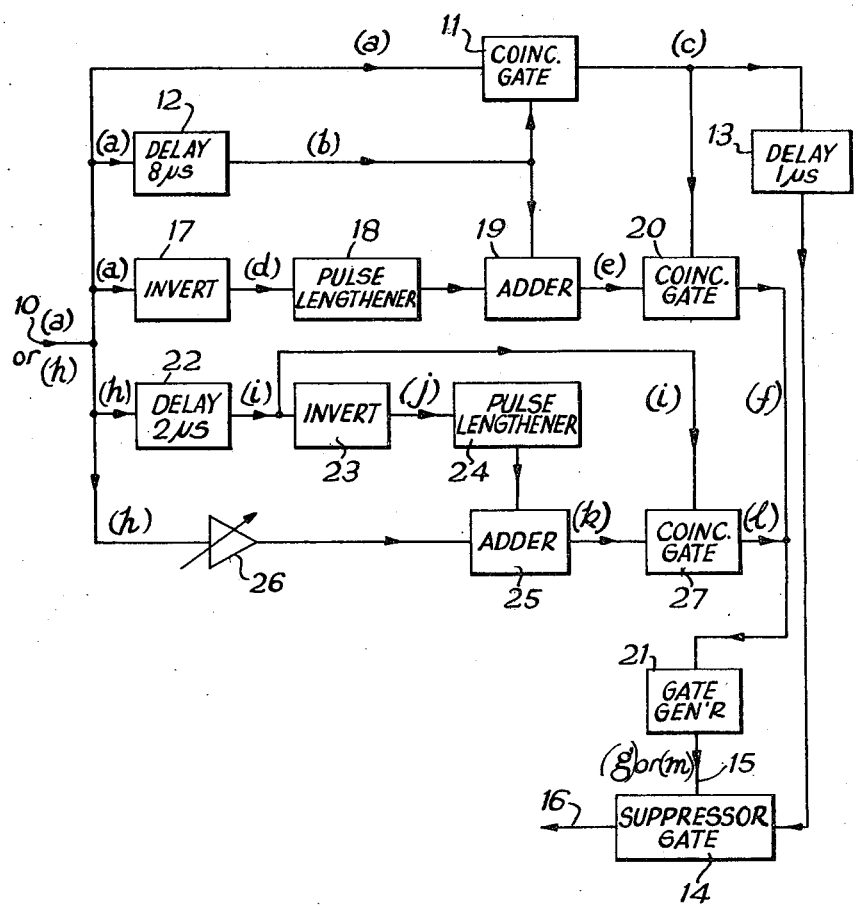

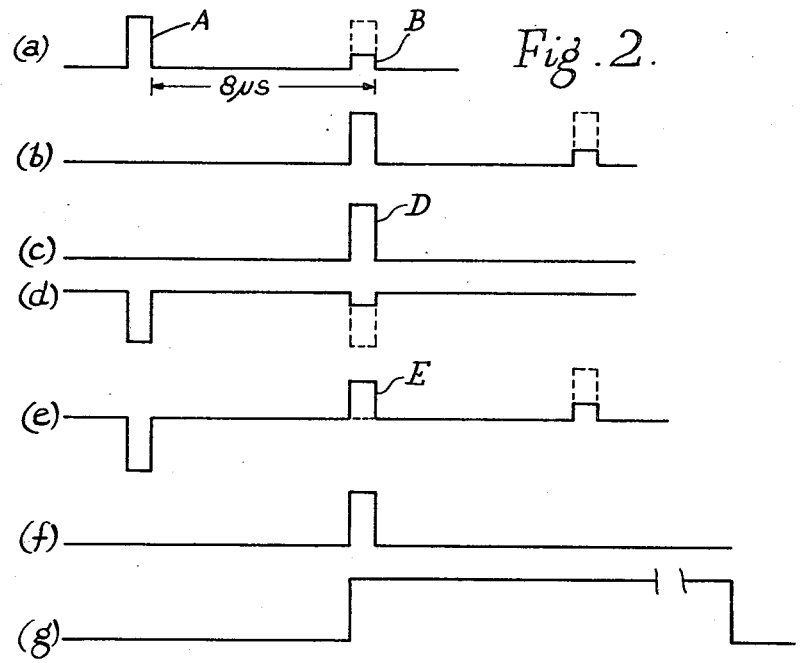
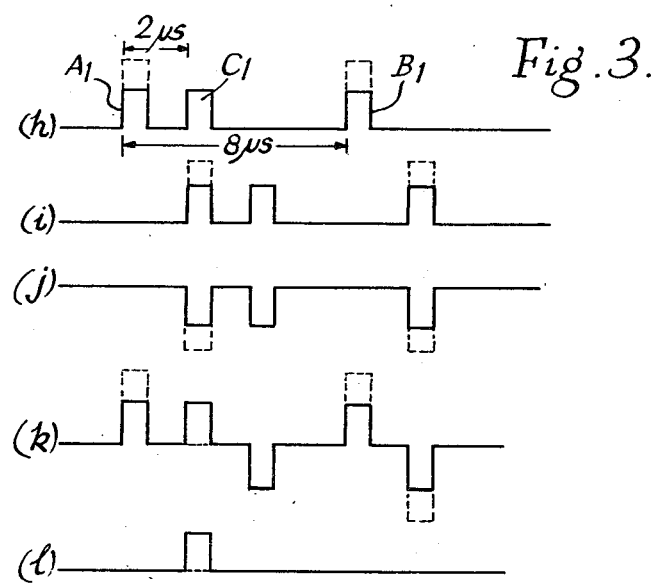

United States Patent Office 3,007,156
Patented Oct. 31, 1961

3,007,156
SECONDARY RADAR SYSTEMS
Peter Francis Barber, London, England, assignor to A. C. Cossor Limited, London, England, a British company
Filed Jan. 25, 1960, Ser. No. 4,409
Claims priority, application Great Britain Oct. 1, 1959
4 Claims. (Cl. 343—6.8)

The present invention relates to secondary radar systems in which recurrent groups of pulses are transmitted and are picked up by a transponder which is arranged to transmit a signal when the interrogating signals picked up have predetermined characteristics. The interrogating transmissions may be from a ground station and the transponder may be in an aircraft.

It is necessary to transmit interrogating pulses from a directional antenna and such an antenna radiates not only in a main lobe but also in side lobes and it is important to prevent actuation of the transponder by signals transmitted in the side lobes.

One secondary radar system, which is the subject of international agreement, employs recurrent pairs of pulses A and B of which the first A is a control pulse radiated from an omnidirectional antenna intended to provide the suppressive function required to prevent response to side lobes of a directional antenna from which pulses B are transmitted. The transponder is so arranged that it is actuated only when the ratio of the amplitude of received pulse B to that of received pulse A is greater than a predetermined value.

Another system has been proposed employing recurrent groups of three pulses of which the first and third $A_1$ and $B_1$ are interrogating pulses radiated from a directional antenna and the second $C_1$ is a control pulse radiated from an omnidirectional antenna. For actuation of the transponder, the ratio of the amplitude of received pulses $A_1$ and $B_1$ (which may be of equal amplitude) to that of received pulse $C_1$ must exceed a predetermined value.

The present invention has for its principal object to provide a simple circuit which operates efficiently with either of the systems hereinbefore referred to.

A further object of the invention is to provide a simple circuit which operates efficiently with either of the systems hereinbefore referred to without the need for adjustment by the operator.

Another object of the present invention is to provide a circuit which is suitable for use with either of the systems hereinbefore referred to which involves only a simple modification of known circuits designed for use with the first of the said systems.

The principle upon which the present invention is based is to recognise when an interrogation pulse is being received from a side lobe, rather than from the main lobe, and when this occurs to suppress actuation of the transponder transmitter.

According to the present invention, therefore, there is provided a transponder suitable for use with a secondary radar system employing recurrent groups of pulses, each group comprising either a control pulse A radiated from an antenna of relatively low directivity followed by an interrogating pulse B radiated by an antenna of relatively high directivity, or two interrogating pulses $A_1$ and $B_1$ separated by the same time interval as pulses A and B and radiated from an antenna of relatively high directivity and in the interval between these pulses a control pulse $C_1$ radiated from an antenna of relatively low directivity, the recurrence period of the groups being much greater than the duration of a group, the transponder comprising first, second and third coincidence gates each of which generates an output only when pulses occur simultaneously at two input terminals thereof, means for applying received signals to one of the input terminals of the first coincidence gate and for applying received signals delayed by substantially the time interval between pulses A and B to the other input terminal of this gate, a suppressor gate connected between the output of the first coincidence gate and the triggering terminal of the transponder, the transmitter of the transponder being actuated by pulses passed through the suppressor gate, when open, to the triggering terminal, a first adder arranged to add the received signal to the received signal delayed by substantially the same time interval, one of these added signals being inverted relatively to the other, the output of the first coincidence gate and the output of the adder, in appropriate senses, to the two input terminals of the second coincidence gate respectively, the output of the second coincidence gate, when present, being applied to close the suppressor gate, a second adder arranged to add the received signal to the received signal delayed by a second time interval substantially equal to that between pulses $A_1$ and $C_1$, one of these added signals being inverted relatively to the other, and means for applying the output of the second adder and the received signal delayed by substantially the second time interval to the two input terminals respectively of the third coincidence gate, the output of the third coincidence gate, when present, being applied to close the suppressor gate.

The invention will be described, by way of example, with reference to the accompanying drawings in which FIG. 1 is a block circuit diagram of one embodiment of the invention and FIGS. 2 and 3 contain idealised waveforms present in FIG. 1. The points in the circuit of FIG. 1 at which waveforms occur are identified by the letters of the waveforms in FIGS. 2 and 3.

Referring to FIG. 1, signals received by a transponder are applied at a terminal 10 and may be of either of the kinds shown in FIG. 2($a$) and FIG. 3($h$), these waveforms being referred to as $a$ and $h$ respectively. Certain time intervals between pulses are assumed in the following description for the sake of clearness but it will, of course, be understood that these intervals are given only by way of example. The waveform $a$ consists of recurrent groups of pulses, each group consists of a pulse A radiated from an omnidirectional antenna and a pulse B radiated 8 microseconds later from a directional antenna. The waveform $h$ consists of recurrent groups of pulses, each group consisting of two pulses $A_1$ and $B_1$ spaced apart by 8 microseconds and radiated from a directional antenna and a pulse $C_1$, occurring 2 microseconds after $A_1$, radiated from an omnidirectional antenna. In FIGS. 2 and 3 the pulses received in a side lobe are represented in full lines and those received in the main lobe are represented in broken lines.

Referring again to FIG. 1, and assuming first that the waveform $a$ is being received, this signal is fed directly to one input terminal of a first coincidence gate 11 and through a delay device 12 introducing a delay of 8 microseconds to the other input terminal of the gate 11. The output of the gate 11 is fed, if desired through a delay device 13 to be referred to later, to a suppressor gate 14 which is closed when a positive-going voltage is applied to its gating terminal 15 but otherwise is open to allow a pulse to pass to 16 and thence to trigger the transmitter of the transponder which is not shown.

The waveform $a$ is also applied to an inverter 17 which reverses its sign and, if desired through a pulse lengthener 18 to be referred to later, to one input terminal of an adder 19. The waveform $b$ from the delay device 12 is applied to the other input terminal of the adder 19. The adder 19 adds together the waveforms $b$ and $d$ to produce the waveform $e$ which is applied to one input terminal of a second coincidence gate 20, the waveform $c$ from the coincidence gate 11 being applied to the other input terminal of the gate 20.

The coincidence gate 11 is arranged to produce an output c whenever simultaneous positive pulses of sufficient amplitude occur at its input terminals. The full line (side lobe) pulse B of waveform a is assumed to have sufficient amplitude to generate an output c and the broken line (main lobe) pulse at B has more than enough amplitude for the purpose. Thus pulses B received in the main lobe always produce an output c and pulses B received in a side lobe may produce an output c. This pulse c is applied through the suppressor gate 14, if this is open, to trigger the transmitter.

The waveform e which is the sum of the waveforms b and d is applied to one input terminal of the second coincidence gate 20 while the waveform c is applied to the other input terminal. This gate 20 will produce an output f if positive pulses of sufficient amplitude occur simultaneously at its two inputs. The waveform c contains a pulse D which is positive-going and coincident in time with the positive-going pulse E of waveform e. The full line pulse E has sufficient amplitude to operate the coincidence gate 20 but this pulse is present only when reception is from a side lobe. In the main lobe the pulse has little or no amplitude. With reception in a side lobe, therefore, a pulse f is generated and is fed to a gate pulse generator 21 which generates the waveform g which closes the suppressor gate 14 and prevents the pulse c from passing to 16. In the main lobe the pulse f is not generated and the suppressor gate 14 remains open to allow the pulse c to pass to 16.

It can readily be seen that if the waveform h is applied to the part of the circuit so far described, no pulse f will be generated and, therefore, so far as this part of the circuit is concerned, the suppressor gate will permit the triggering pulses to pass provided that the received pulses $A_1$ and $B_1$ have sufficient amplitude to operate the coincidence gates.

Now considering the part of the circuit concerned with side lobe suppression when the waveform h is present. This comprises a delay device 22 introducing a delay of 2 microseconds, an inverter 23, if desired a pulse lengthener 24 referred to later, and an adder 25. The waveform h is also applied (through an amplifier 26, if desired, which may be of variable gain) to the adder 25. The adder 25 adds together the waveforms h and j to produce the waveform k which is applied to one input terminal of a third coincidence gate 27 the output e of which is applied to the gate pulse generator 21.

It will be seen from FIG. 3 that the only coincident positive-going pulses in the waveforms i and k applied to the input terminals of the gate 27 are those occurring at the time of pulse $C_1$ in waveform h and these pulses have sufficient amplitude to produce an output e only in a side lobe. In the main lobe the pulse in i has sufficient amplitude but that in k, which is the sum of h and j, has not. In a side lobe therefore, a pulse e will be generated to actuate the pulse generator 21 which then generates a suppression waveform m which closes the gate 14 and prevents the pulse c from reaching the triggering terminal 16. The pulse c is generated as described earlier by the coincidence gate 11 when pulses $A_1$ and $B_1$ occur at the correct time spacing and at sufficient amplitude.

It can readily be seen that the waveform a produces no effect upon the operation of the part of the circuit including the elements 22, 23, 24, 25, 26 and 27. The delay device 13, introducing for example a delay of one microsecond, may be provided to ensure that the pulse c is completely suppressed by the waveform g or m.

The pulse lengtheners 18 and 24 ensure that there is coincidence in time between the appropriate pulses while permitting an adequate tolerance. The time delays introduced by 12 and 22 should be slightly modified when the pulse lengtheners are used in order to take full advantage of the lengthened pulses. For instance if the pulses normally have a duration of 1 microsecond and if they are lengthened to 1.5 microseconds the delay introduced by 12 should be increased by about 0.25 microsecond and the delay introduced by 22 should be increased by about the same amount. A further pulse lengthener may be included between terminal 10 and the gate 11.

It will be evident that pulse lengtheners may be disposed in different positions from those shown and that amplifiers, which may be of variable gain, can be provided in other branches of the circuit in order to permit adjustment of the relative amplitude of the pulses. Attenuators, which may be variable, can be provided for the same purpose.

One or more cathode followers (or, in the case of transistors, emitter followers) may be provided between the terminal 10 and any or all of the elements 11, 12, 17, 22 or 26 in order to prevent undesirable loading of the output stage of the receiver of an existing transponder to which the invention may be applied.

It will be appreciated that many rearrangements of circuit elements can be made without affecting the mode of operation of the circuit. For example the inverter 23 may be placed between the amplifier 26 and the adder 25 or it may be omitted if the amplifier 26 itself provided the required inversion.

I claim:

1. A transponder suitable for use with a secondary radar system employing recurrent groups of pulses, each group comprising either a control pulse A radiated from an antenna of relatively low directivity followed by an interrogating pulse B radiated by an antenna of relatively high directivity, or two interrogating pulses $A_1$ and $B_1$ separated by the same time interval as pulses A and B and radiated from an antenna of relatively high directivity and in the interval between these pulses a control pulse $C_1$ radiated from an antenna of relatively low directivity, the recurrence period of the groups being much greater than the duration of a group, said transponder comprising a transmitter, a receiver having a terminal at which said recurrent pulse groups are received, first, second and third coincidence gates each having two input and one output terminal and generating an output at said output terminal in response to pulses applied simultaneously to its two input terminals, means coupling said receiver terminal to one input terminal of said first coincidence gate, a first delay means introducing a time delay substantially equal to the time interval between pulses A and B, means coupling said receiver terminal through said first delay means to the other input terminal of said first coincidence gate, a trigger terminal, pulses applied to said trigger terminal actuating said transmitter, a suppressor gate coupled between said output terminal of said first coincidence gate and said trigger terminal, said suppressor gate having a gating terminal and when closed by a signal applied to said gating terminal preventing the passage of pulses to said trigger terminal, a first adder having two input terminals and an output terminal at which the sum of signals applied to the adder input terminals appears, means coupling one adder input terminal to said receiver terminal, means coupling the other adder input terminal through said first delay means to said receiver terminal, phase inverting means included in one of the last two said coupling means, means coupling the output terminal of said first coincidence gate to one input terminal of said second coincidence gate, means coupling the output terminal of said first adder to the other input terminal of said second coincidence gate, means coupling the output terminal of said second coincidence gate to said gating terminals of said suppressor gate, a second adder having two input terminals and an output terminal at which the sum of signals applied to the second adder input terminals appears, a second delay means introducing a time delay substantially equal to the time interval between pulses $A_1$ and $C_1$, means coupling one of second adder input terminals to said receiver terminal, means coupling the other second adder input terminal through said second delay means to said receiver terminal, further inverting means included in one of the last two said coupling means, means coupling the output terminal of said second adder to one input terminal of said third coincidence gate, means coupling the other input terminal of said third coincidence gate through said second delay means to said receiver terminal and means coupling the output terminal of said third coincidence gate to said gating terminal of said suppressor gate.

2. A transponder according to claim 1, comprising pulse lengthening means coupled between said receiver terminal and at least one of said adders.

3. A transponder according to claim 1, comprising gating waveform generator means coupled between said output terminals of said second and third coincidence gates and said gating terminal.

4. A transponder according to claim 1, comprising further time delay means coupled between the output of said first coincidence gate and said suppressor gate.

No references cited.